(12) United States Patent
Ahn et al.

(10) Patent No.: US 6,630,976 B2
(45) Date of Patent: Oct. 7, 2003

(54) ARRAY SUBSTRATE FOR USE IN LCD DEVICE

(75) Inventors: Byung-Chul Ahn, Kyoungsangbuk-do (KR); Jae-Gu Lee, Kyoungsangbuk-do (KR); Yu-Ho Jung, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 32 days.

(21) Appl. No.: 09/736,410

(22) Filed: Dec. 15, 2000

(65) Prior Publication Data

US 2001/0013910 A1 Aug. 16, 2001

(30) Foreign Application Priority Data

Dec. 17, 1999 (KR) .............................................. 99-58750

(51) Int. Cl.[7] .............................................. G02F 1/1343
(52) U.S. Cl. .......................... 349/139; 349/54; 349/192; 349/187; 257/59
(58) Field of Search .......................... 349/55, 38, 192, 349/43, 139, 54; 359/59, 87; 257/292, 59

(56) References Cited

U.S. PATENT DOCUMENTS 5,303,074 A * 4/1994 Salisbury .................... 257/292
6,310,669 B1 * 10/2001 Kobayashi et al. .......... 257/59
6,313,889 B1 * 11/2001 Song et al. .................. 349/192

* cited by examiner

Primary Examiner—Toan Ton
Assistant Examiner—P. R. Akkapeddi
(74) Attorney, Agent, or Firm—Birch, Stewart, Kolasch & Birch, LLP

(57) ABSTRACT

A TFT array substrate for use in an LCD device includes at least one repair line to repair line defects. The repair line(s) is formed when forming the pixel electrode so that additional process steps are not required. Accordingly, productivity can be increased. Moreover, either a short-circuit or an open-circuit can be repaired due to the repair line(s). Thus, in the present invention, a TFT array substrate, including: a substrate; a gate line formed on the substrate, arranged in a transverse direction and having a gate electrode; a data line insulated against the gate line by a first insulation layer, arranged in a longitudinal direction perpendicular to the gate line, having a source electrode near the cross point of the gate and data lines, and having first and second data lines which are defined by a cross point of the gate and data lines; a drain electrode space apart from the source electrode over the gate electrode; a pixel electrode connecting to the drain electrode; and a repair line(s) insulated against the data and gate lines by insulation layers and overlapping the gate and data lines, one repair line overlapping a free end of the other repair line and the gate line.

5 Claims, 7 Drawing Sheets

ARRAY SUBSTRATE FOR USE IN LCD DEVICE

CROSS REFERENCE

This application claims the benefit of Korean Patent Application No. 1999-58750, filed on Dec. 17, 1999, which is hereby incorporated by reference.

BACKGROUND OF THE INVENTION

1. Field of the Invention

The present invention relates to a liquid crystal display (LCD) device, and more particularly, to an array substrate of the LCD device having thin film transistors.

2. Description of Related Art

In general, a liquid crystal display (LCD) device displays an image using a plurality of pixels. The LCD device having a thin film transistor (TFT) as a switching element is typically called a thin film transistor liquid crystal display (TFT-LCD) device.

A typical liquid crystal display device uses optical anisotropy and polarization properties of liquid crystal molecules. The liquid crystal molecules have a definite orientational order in arrangement resulting from their thin and long shapes. The arrangement direction of the liquid crystal molecules can be controlled by supplying an electric field to the liquid crystal molecules. In other words, if electric fields are applied to the liquid crystal molecules, the arrangement of the liquid crystal molecules changes. Since incident light is refracted according to the arrangement direction of the liquid crystal molecules due to the optical anisotropy of the arranged liquid crystal molecules, image data can be displayed.

By now, an active matrix LCD (AM-LCD) that the thin film transistors and the pixel electrodes are arranged in the form of a matrix is receiving a great deal of attention due to its high resolution and superiority in displaying moving video data.

FIG. 1 is a cross-sectional view illustrating a conventional liquid crystal display (LCD) panel. As shown in FIG. 1, the LCD panel 20 has lower and upper substrates 2 and 4 with a liquid crystal layer 10 interposed between the lower and upper substrates 2 and 4. The lower substrate 2 has the TFT "S" as a switching element to change an orientation of the LC molecules and includes a pixel electrode 14 to apply a voltage to the LC layer 10 according to signals of the TFT "S". The upper substrate 4 has a color filter 8 for implementing colors and a common electrode 12 on the color filter 8. The common electrode 12 serves as an electrode for applying a voltage to the LC layer 10. The pixel electrode 14 is arranged over a pixel portion "P", i.e., a display area. Further, to prevent leakage of the LC injected into a space between the two substrates 2 and 4, the two substrates 2 and 4 are sealed by a sealant 6.

FIG. 2 is a plan view illustrating an array substrate. A gate line 22 is arranged in a transverse direction and a data line 24 is arranged in a longitudinal direction perpendicular to the gate line 22 such that pixel region having pixel electrode 14 is defined by the gate line 22 and the data line 24.

In the AM-LCD, the switching element (TFT "S") applying the voltage to the LC layer 10 (see FIG. 1) is formed nearby the cross point of the gate line 22 and the data line 24. The TFT "S" has a gate electrode 26 extended from the gate line 22, a source electrode 28 extended from the data line 24 and a drain electrode 30 electrically contacting the pixel electrode 14 via contact hole (not shown). When the gate electrode 26 of the TFT receives gate signals, in the ON-state, the data line 24 transmits data signals to the pixel electrode 14. On the other hand, when the gate electrode 26 is in the OFF-state, data signals are not transmitted to the pixel electrode 14. In general, a manufacturing process depends on the materials of the elements used, and on the intended design. For example, the resistivity of the material used in the gate line and the data line determines the picture quality in a large LCD panel (over 18 inches) and in an LCD panel having a high resolution. In the case of these LCD panels, the material such as Aluminum (Al) or Al-alloy is used for the gate line and data line.

FIGS. 3a to 3d are cross-sectional views illustrating process steps for fabricating a conventional array substrate for the active matrix LCD device.

An inverted staggered type TFT is generally used for an LCD device due to the simple structure and superior efficiency. The inverted staggered type TFT includes a back channel etched type (EB) and an etch stopper type (ES). The manufacturing method of the back channel etched type TFT will be explained hereinafter.

First, a first metal layer is deposited on a substrate 1 by a sputtering process after a cleaning process which enhances adhesion between the substrate 1 and a metal layer and removes organic materials and alien substances from the substrate. FIG. 3a shows a step for forming the gate line 22, the gate electrode 26 and a capacitor electrode 32 by patterning the first metal layer using a first mask. As a metal for the gate electrode 26, Aluminum is mainly used so as to reduce the RC delay owing to its low resistance. However, pure Aluminum is weak in acidity and may result in line defects by a formation of a hillock during a high temperature process, so Aluminum alloy and multi-layered Aluminum are used.

Referring to FIG. 3b, the gate insulation layer 34 is formed on the entire surface of the substrate 1, while covering the gate line 22 and the gate and capacitor electrodes 26 and 32. Then, a pure amorphous silicon (a-Si:H) layer and a doped amorphous silicon ($n^+$a-Si:H) layer are formed in series on the gate insulation layer 34. As shown in FIG. 3b, an active layer 36 and an ohmic contact layer 38 are formed by patterning the silicon layers. The ohmic contact layer 38 reduces contact resistance between the active layer 36 and an electrode that will be formed later.

As depicted in FIG. 3c, the data line 24 and the source and drain electrodes 42 and 44 are formed by depositing, and then patterning, a second metal layer. A metal for the source and drain electrodes 42 and 44 may be selected from Cr, Mo, or the like. The portion of the ohmic contact layer 38 on the active layer 36 is etched using the source and drain electrodes 42 and 44 as a mask. If the ohmic contact layer 38 between the source and drain electrodes 42 and 44 is not removed, serious problems such as deterioration of electrical characteristics and efficiencies can be caused in the TFT "S" (see FIG. 2). Etching the portion of the ohmic contact layer 38 over the gate electrode 26 requires special attention. While etching the ohmic contact layer 38, the active layer 36 is over-etched by 50–100 nm due to the fact that the active layer 36 and the ohmic contact layer 38 have the same etch selectivity. This is because etching uniformity directly affects the electrical characteristics of the TFT.

As shown in FIG. 3d, a protection layer 46 is formed on the source and drain electrodes 42 and 44 in order to protect the active layer 36 by depositing, and then patterning, an insulating material. Due to an unstable energy state of the active layer 36 and an alien substances generated during the etching process (which affect electrical characteristics of the TFT), the protection layer 46 is usually made of a material selected from inorganic materials such as $SiN_x$ and $SiO_2$, or organic materials such as BCB (benzocyclobutene). In addition, the protection layer 46 is used as a material having high light transmittance, humidity resistance and durability, in order to protect the channel area of the TFT and major portions of a pixel region from possible humidity and scratch (occurring during later process steps).

A contact hole 45 is formed in the protection layer 46 to expose the portion of the rain electrode 44. FIG. 3d also shows a step of forming a pixel electrode 40 by depositing, and then patterning, a transparent conducting oxide (TCO) layer. Indium tin oxide (ITO) is usually employed for the transparent conducting oxide layer. The pixel electrode 40 makes electrical contact with the drain electrode 44 via the contact hole 45 and overlaps the capacitor electrode 32 to form a storage capacitor.

In the above-mentioned process, the gate insulation layer 34 is formed to insulate the gate electrode 26 from the active layer 36, generally by using a Chemical Vapor Deposition (CVD). However, while forming the gate insulation layer 34 using the CVD equipment, various kinds of gases are used therein. Then alien substances or defects can be formed in the decomposition process of these gases.

FIG. 4 is an enlarged view of the portion "H" of FIG. 3d, which is the same as the portion "H" of FIG. 2. The portion "H" is the cross point of the gate line 22 and the data line 24. As shown in FIG. 4, the gate insulation layer 34 is formed between the gate and data lines 22 and 24. When forming the gate insulation layer 34 on the gate line 22, the alien substance "P" can be deposited from the CVD equipment. If the alien substance "P" is deposited on the gate line 22 in the portion "H" where the gate and data lines 22 and 24 cross each other, unusual growth occurs in the portion "H" during the process of forming the gate insulation layer 34. When the data line 24 is formed on the unusual-growing gate insulation layer 34, a short circuit occurs between the gate and data lines 22 and 24. The alien substance, and related defect, have caused serious problems in the conventional art due to the impossibility of repair. Therefore, the gate and data lines 22 and 24 acquire a line defect causing serious inferiority in the LCD device.

FIG. 5 is a cross-sectional view taken along line V—V of FIG. 2 illustrating the cross point of the gate and data lines 22 and 24. The data line 24 on the gate insulation layer 34 can be open, owing to the step portion of the gate line 22. Therefore, this also is a line defect, and causes decreased manufacturing yields of the LCD device.

SUMMARY OF THE INVENTION

An object of the present invention is to provide a TFT array substrate for use in an LCD device, and more particularly, an array substrate having a repair structure when a short occurs between gate and data lines or when the data line is open.

To achieve these and other advantages and in accordance with the purpose of the present invention, as embodied and broadly described, a TFT array substrate for use in a liquid crystal display device, including: a substrate; a gate line formed on the substrate, arranged in a transverse direction and having a gate electrode; a data line insulated against the gate line by a first insulation layer, arranged in a longitudinal direction perpendicular to the gate line, the data line having a source electrode near the cross point of the gate and data lines and having first and second data lines which are defined separately by the cross point of the gate and data lines; a drain electrode spaced apart from the source electrode over the gate electrode; a first repair line extended from the first data line and crossing the gate line; a pixel electrode connecting to the drain electrode; and a second repair line insulated against the data line by a second insulation layer, and overlapping the second data line and a free end of the first repair line.

The second repair line of the TFT array substrate is made of the same material as the pixel electrode.

In order to achieve the above objects, in another aspect, the preferred embodiment of the present invention provides a TFT array substrate, including: a substrate; a gate line formed on the substrate and arranged in a transverse direction; a data line insulated against the gate line by a first insulation layer and arranged in a longitudinal direction perpendicular to the gate line; the gate line having first and second gate lines which are defined separately by the cross point of the gate and data lines; the data line having third and fourth data lines which are defined separately by the cross point of the gate and data lines; a thin film transistor having gate, source and drain electrodes; a pixel electrode connecting to the drain electrode of the thin film transistor; and a repair line insulated from the gate and data lines by a second insulation layer, and overlapping the first and second gate lines and the third and fourth data lines.

The repair line of the second embodiment of the present invention is made of the same material as the pixel electrode. Further, the repair line crosses the gate line at the cross point of the gate and data lines.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE REFERRED EMBODIMENTS

Reference will now be made in detail to preferred embodiments of the present invention, examples of which are illustrated in the accompanying drawings.

Figure 6:
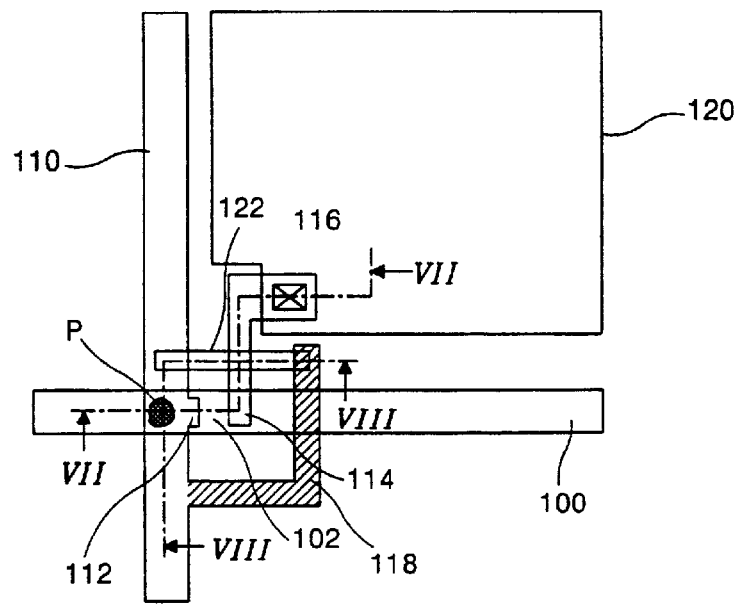
FIG. 6 is a plan view illustrating a pixel of the embodiment of the present invention.

FIG. 6 is a plan view illustrating a pixel of a thin film transistor (TFT) array substrate for use in a liquid crystal display (LCD) panel according to a preferred embodiment of the invention. A gate line 100 is arranged in a transverse direction and a data line 110 is arranged in a longitudinal direction perpendicular to the gate line 100. A portion of the gate line 100 acts as a gate electrode 102. A source electrode 112 is extended from the data line 110 and overlaps the predetermined portion of the gate electrode 102. A drain electrode 114 is formed spaced apart from the source electrode 112 over the gate electrode 102. And then a transparent pixel electrode 120 is formed connecting to the drain electrode 114. And a pixel region having the pixel electrode 120 is defined by the gate line 100 and the data line 110.

Then a first repair line 118 which is extended from the data line 110 and crosses the gate line 100 is formed, so that the first repair line 118 detours around the drain electrode 1 14 and extends alongside the data line 110 and the drain electrode, 114. Moreover, the first repair line 118 is made of the same material as the pixel electrode 120. A second repair line 122 which overlaps the unattached end of the first repair line 118 and the data line 110 is formed over, and across the drain electrode 114.

Figure 7:
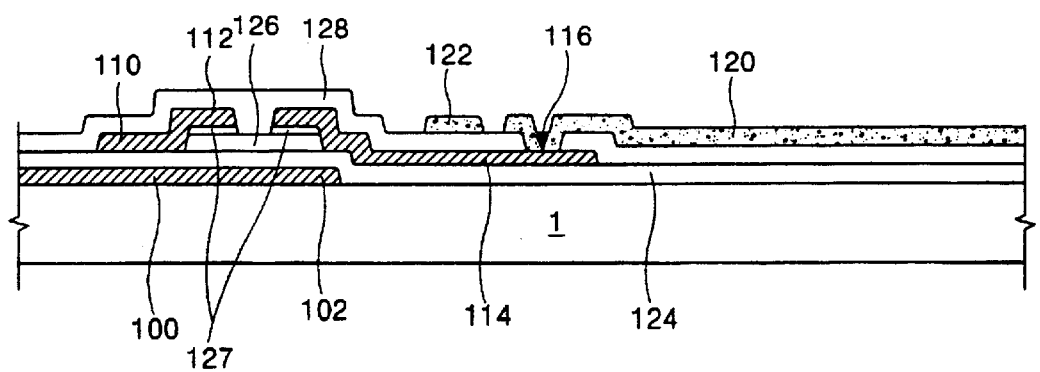
FIG. 7 is a cross-sectional view taken line VII—VII of FIG. 6.

FIG. 7 is a cross-sectional view taken line VII—VII of FIG. 6 and illustrates a stacked structure of the TFT array substrate. The gate line 100 and the gate electrode 102 defined in the gate line 100 are formed on a substrate 1. A first insulation layer 124 is formed on the entire surface. Then an active layer 126 is formed on the first insulation layer 124 over the gate electrode 102. Ohmic contact layers 127 are formed and patterned on the active layer 126. Source and drain electrodes 112 and 114 are formed on the ohmic contact layers 127, respectively. Further, a second insulation or protection layer 128 is accumulated on the entire surfaces and is etched to form a drain contact hole 116 which exposes a portion of the drain electrode 114. The pixel electrode 120 being in contact with the drain electrode 114 via drain contact hole 116, is formed on the second insulation or protection layer 128. The second repair line 122 is formed being independent of the pixel electrode 120 and made of the same material as the pixel electrode 120. Preferrably, the pixel electrode 120 is made of ITO (indium-tin-oxide) or IZO (indium-zinc-oxide).

Figure 8:
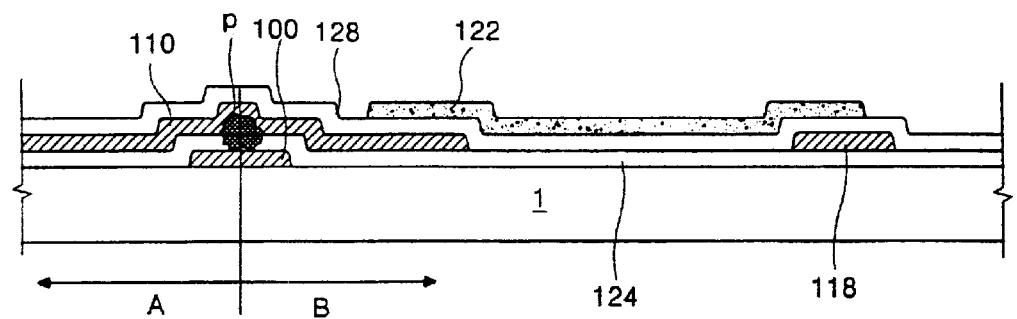
FIG. 8 is a cross-sectional view taken line VIII—VIII of FIG. 6.

FIG. 8 is a cross-sectional view taken line VIII—VIII of FIG. 6 and illustrates a stacked structure of the TFT array substrate on the assumption that an alien substance "P" is formed at the cross point of and between the gate and data lines 100 and 110. If the alien substance "P" is formed on the gate line 100, the first or gate insulation layer 124 formed on the gate line 100 becomes deformed. The data line 110 and the first repair line 118 are formed on the gate insulation layer 124. Moreover, the second insulation or protection layer 128 is formed on the entire surfaces. Subsequently, the second repair line 122 is formed on the second insulation or protection layer 128.

In this embodiment, with reference to FIGS. 6 and 8, the first repair line 118 extends from a portion of the data line 110 positioned in the area "A". The second repair line 122 insulated by the protection layer 128 overlaps a portion of the data line 110 positioned in the area "B". And the second repair line 122 also overlaps the first repair line 118.

Figure 9:
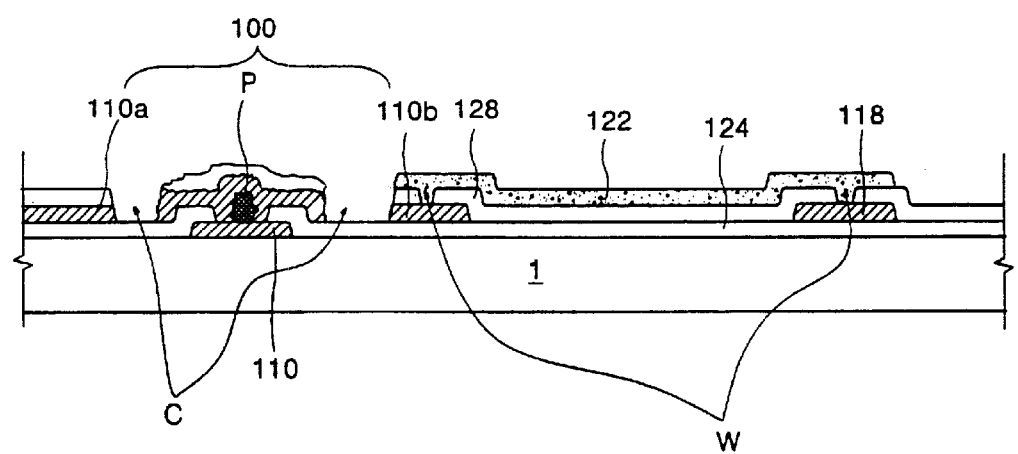
FIG. 9 is a similar view to FIG. 8 and illustrates a method of repairing the short of the gate and data lines according to a first embodiment of the present invention.

FIG. 9 illustrates a method of repairing the short of the gate and data lines according to a first embodiment of the present invention. The data line 110 formed on the gate insulation layer 124 with the alien substance "P" is electrically short-circuited to the gate line 100. Hence, both sides of the short-circuited portion of the data line 110 is cut by a laser or other equipment having a high energy density. Thus, the data line 110 is divided into first and second data lines 110a and 110b, each positioned at opposing sides of the cutting portions "C". Therefore, by cutting the data line 110, the first and second data lines 110a and 110b are electrically independent, and then the first and second repair lines 118 and 122 are used for connecting the first and second data lines 110a and 110b.

As shown in FIG. 9, to repair the data line 110, the overlapped portions "W" of the second repair line 122, each corresponding to the second data line 110b and the first repair line 118, are welded by the laser, or other equipment having a high energy density.

Figure 1:
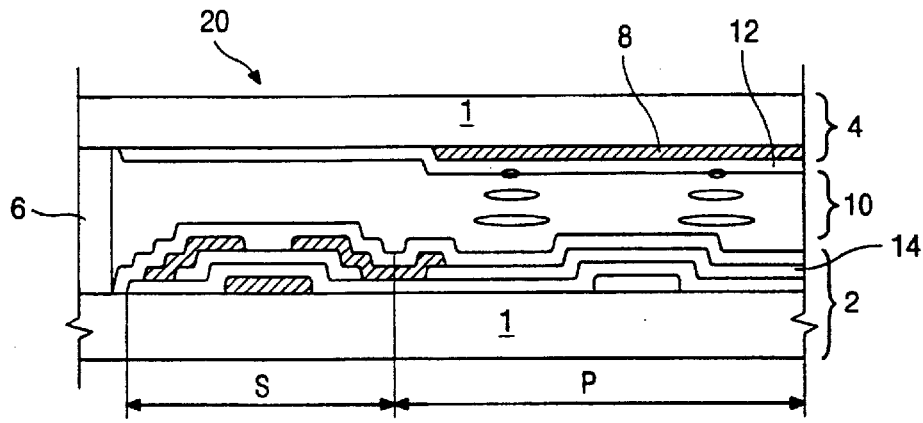
FIG. 1 is a cross-sectional view illustrating a general liquid crystal display (LCD) panel.
Figure 2:
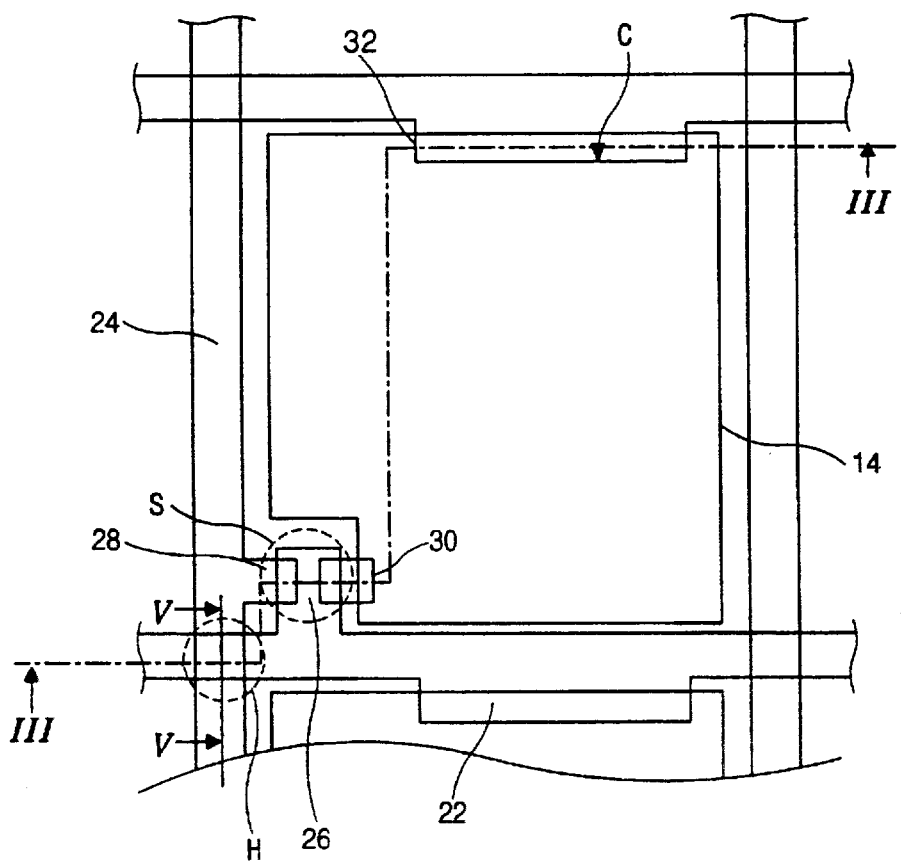
FIG. 2 is a plan view illustrating a pixel of the conventional LCD panel.
Figure 3A:
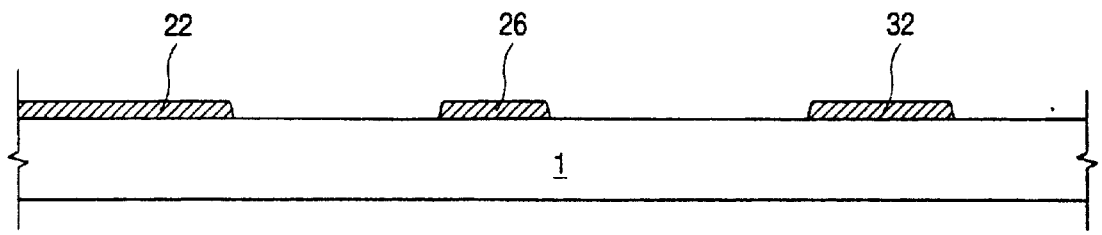
FIGS. 3a to 3d are cross-sectional view taken line III—III of FIG. 2 and illustrates process steps of fabricating a conventional TFT array substrate.
Figure 3B:
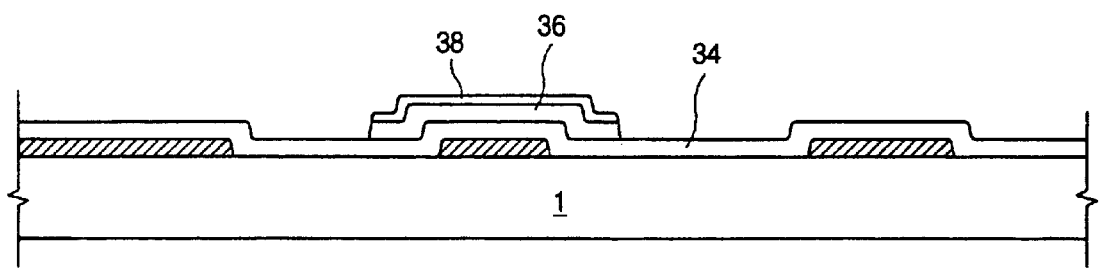
Figure 3C:
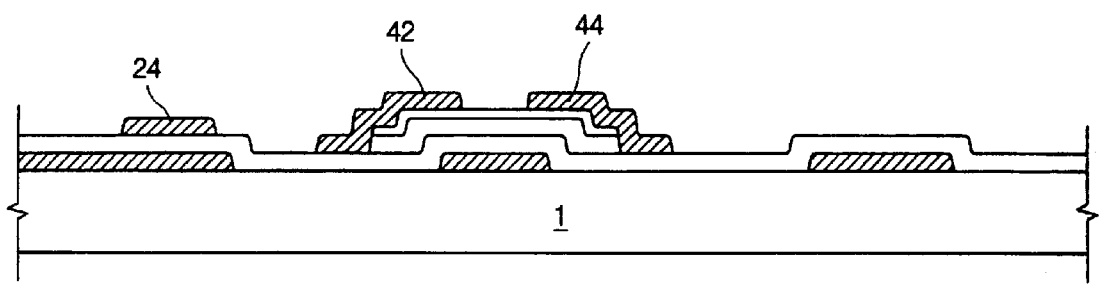
Figure 3D:
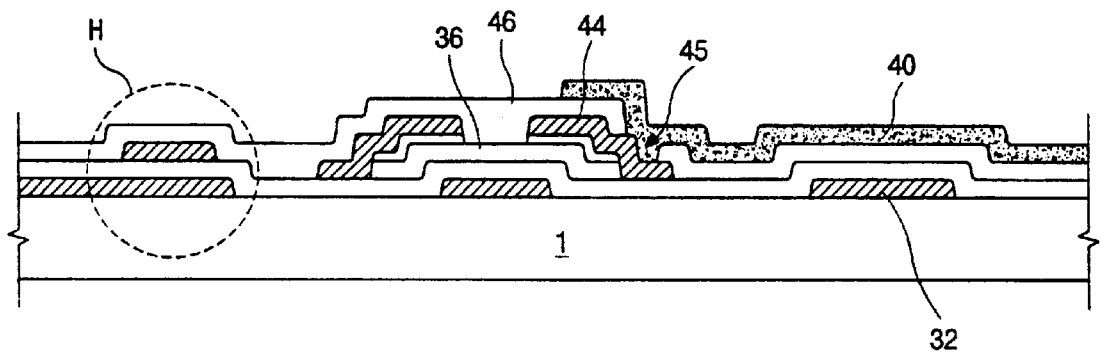
Figure 4:
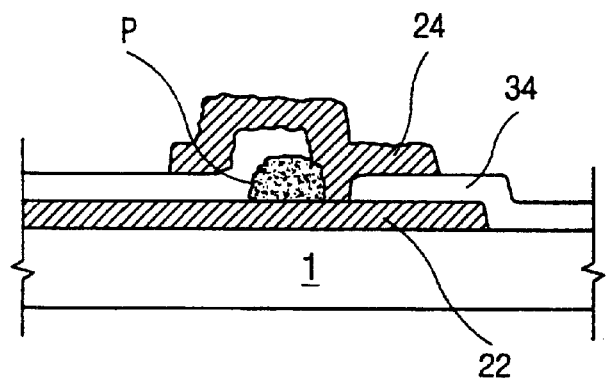
FIG. 4 is an enlarged view of the portion "H" of FIG. 3d.
Figure 5:
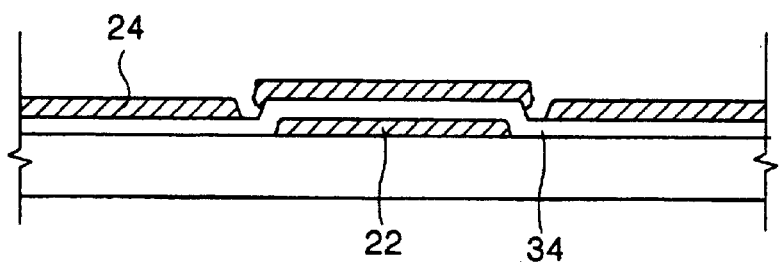
FIG. 5 is a cross-sectional view taken line V—V of FIG. 2.

As described above, the TFT array substrate integrity can be recovered using the first and second repair lines 118 and 122, i.e., the data signal makes a detour to avoid a short-circuit. Moreover, the described method can repair an open-circuit resulting from the step portion of the gate line 100 (see FIG. 5). To repair the open-circuit, the above repair steps can be performed excluding a cutting process step, since "open-circuit" means that the data line is cut.

In the second embodiment, a method using one repair line is provided, whereas the first embodiment provided the method of repairing the data line using two repair lines, the first repair line extended from the data line and the second repair line formed with the pixel electrode.

Figure 10A:
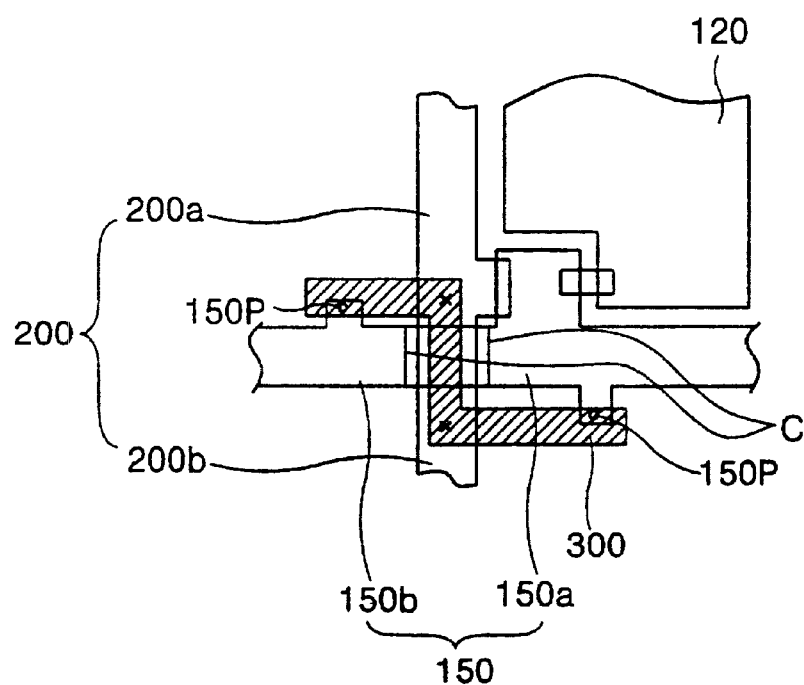
FIGS. 10a to 10c are plan views illustrating repair structures according to a second embodiment of the present invention.
Figure 10B:
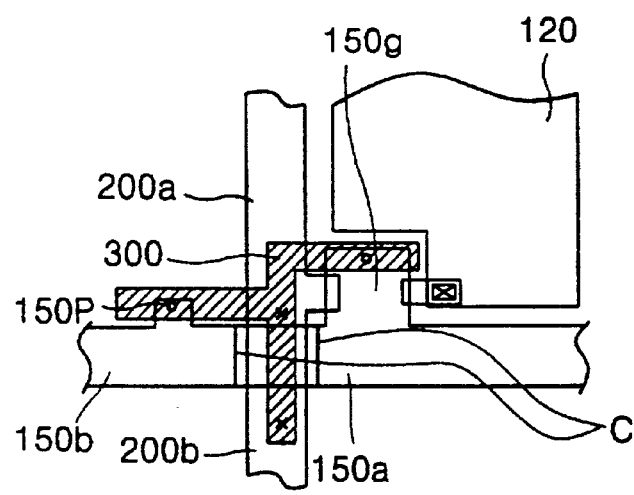
Figure 10C:
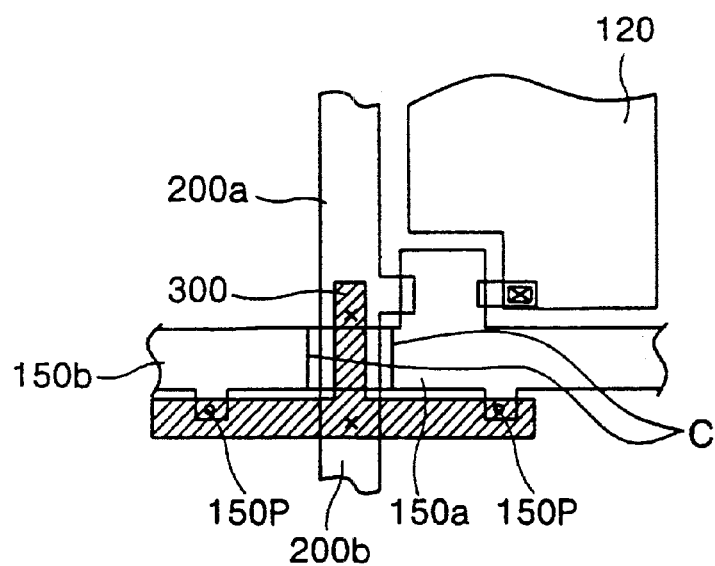

FIGS. 10a to 10c are plan views illustrating repair structures focused on the cross point of the gate and data lines according to a second embodiment of the present invention. FIGS. 10a to 10c represent the examples of the second embodiment for use in the LCD device and also show the repairing method for a short-circuit between the gate and data lines and an open-circuit of the data line.

The gate line 150 can be divided into first and second gate lines 150a and 150b by the cross point of the gate and data lines. The data line 200 can also be divided into third and fourth data lines 200a and 200b by the cross point of the gate and data lines. The repair line 300 is formed when forming the pixel electrode 120 and is made of the same material as the pixel electrode 120. At this time, the repair line 300 overlaps portions of the first and second gate lines 150a and 150b and the third and fourth data lines 200a and 200b. The overlapped portions of the gate lines 150a and 150b can have a protrusion shape 150P or a portion of the protruded gate electrode 150g can be overlapped (see FIG. 10b). Moreover, the repair line 300 is insulated against the gate and data lines 150 and 200 by the protection layer, since the protection layer covers the whole substrate after the gate and data lines are formed, and then the pixel electrode is formed on the protection layer (which can be understood in FIG. 7).

In the case of a short-circuit caused by an alien substance at the cross point of the gate and data lines 150 and 200, the portions "C" of the FIGS. 10a to 10c (both sides of the cross point in the gate line) are cut, and then each of the overlapped portions of the repair line 300 and the first and second gate lines 150a and 150b are welded. From these processes, the short-circuit between the gate and data lines is repaired.

On the other hand, in the case of the open-circuit of the data line 200 at the step portion of the gate line 150 (see FIG. 5), the portions "x" of the repair line 300 and the first and second data lines 200a and 200b are welded so that the open-circuit of the data line 200 is repaired.

As described above, the second embodiment of the present invention suggests a repair line which is independent of the pixel electrode and prevents the short-circuit and the open-circuit at the cross point of the gate and data lines. When the short-circuit or the open-circuit occurs, the cutting and welding process can repair them using the repair line and a laser.

According to the first and second embodiment, the repair line is formed while forming the pixel electrode so that additional process steps are not required. Accordingly, without an increase in manufacturing costs, repair can be achieved.

Thus, it is intended that the present invention covers the modifications and variations of this invention provided they come within the scope of the appended claims and their equivalents.

What is claimed is:

1. A thin film transistor (TFT) array substrate for use in a liquid crystal display (LCD) device, comprising:

a substrate;

a gate line formed on the substrate arranged in a transverse direction and having a gate electrode;

a data line insulated against the gate line by a first insulation layer, arranged in a longitudinal direction perpendicular to the gate line, the data line having a source electrode near the cross point of the gate and data lines and having first and second data lines which are defined separately by the cross point of the gate and data lines;

a drain electrode spaced apart from the source electrode over the gate electrode;

a first repair line extended from the first data line and crossing the gate line, wherein said repair line is not comprised of said first data line and said gate line;

a pixel electrode connecting to the drain electrode; and a second repair line insulated from the data line by a second insulation layer, and overlapping the second data line and a free end of the first repair line.

2. A TFT array substrate of claim 1, wherein the second repair line is made of the same material as the pixel electrode.

3. A thin film transistor (TFT) array substrate for use in a liquid crystal display (LCD) device, comprising:

a substrate;

a gate line formed on the substrate and arranged in a transverse direction;

a data line insulated against the gate line by a first insulation layer and arranged in a longitudinal direction perpendicular to the gate line;

the gate line having first and second gate lines which are defined separately by the cross point of the gate and data lines;

the data line having third and fourth data lines which are defined separately by the cross point of the gate and data lines;

a thin film transistor having gate, source and drain electrodes;

a pixel electrode connecting to the drain electrode of the thin film transistor; and a repair line insulated from the gate and data lines by a second insulation layer, and overlapping the first and second gate lines and the third and fourth data lines, wherein said gate and data lines do not comprise a portion of said repair line.

4. A TFT array substrate of claim 3, wherein the repair line is made of the same material as the pixel electrode.

5. A TFT array substrate of claim 3, wherein the repair line crosses the gate line at the cross point of the gate and data lines.

* * * * *